United States Patent [19]

Delling et al.

[11] Patent Number: 5,759,507

[45] Date of Patent: Jun. 2, 1998

[54] PROCESS FOR PRODUCTION OF DENSE SODA ASH FROM SODA ASH FINES

[75] Inventors: David R. Delling, Taos, N. Mex.; Kevin L. Green, Green River, Wyo.; James D. Phillip, Green River, Wyo.; Donald M. Robertson, Green River, Wyo.

[73] Assignee: Solvay Minerals, Inc., Houston, Tex.

[21] Appl. No.: 770,594

[22] Filed: Dec. 19, 1996

Related U.S. Application Data

[63] Continuation of Ser. No. 438,891, May 10, 1995, abandoned.

[51] Int. Cl.$^6$ ............................................. C01D 7/00
[52] U.S. Cl. .................................... 423/426; 423/421
[58] Field of Search ............................ 423/421, 426

[56] References Cited

U.S. PATENT DOCUMENTS

| | | |
|---|---|---|
| 1,877,368 | 9/1932 | Seyer ............................ 423/421 |
| 2,347,053 | 4/1944 | Houghton . | 
| 2,962,348 | 11/1960 | Seglin et al. ...................... 423/421 |
| 3,104,942 | 9/1963 | Handwerk et al. . |
| 3,448,744 | 6/1969 | Frint et al. . |
| 3,594,119 | 7/1971 | Pruiss et al. ..................... 423/421 |
| 3,975,499 | 8/1976 | Walden ............................. 423/421 |
| 4,039,617 | 8/1977 | Kuo . |
| 4,564,508 | 1/1986 | Fairweather et al. . |
| 4,738,836 | 4/1988 | Poncha et al. . |
| 5,198,145 | 3/1993 | Lobunez et al. . |

FOREIGN PATENT DOCUMENTS

| | | |
|---|---|---|
| 0 191 512 A1 | 8/1986 | European Pat. Off. . |
| 0 542 351 A1 | 5/1993 | European Pat. Off. . |

OTHER PUBLICATIONS

European Search Report Oct. 27, 1997 for counterpart foreign application No. EP 96 20 1222.

*Primary Examiner*—Wayne Langel
*Attorney, Agent, or Firm*—Brinks Hofer Gilson & Lione

[57] ABSTRACT

This invention provides a method for the production of dense soda ash by reacting sodium carbonate decahydrate with a light soda ash or soda ash fines at an elevated temperature to produce sodium carbonate monohydrate crystals, and drying the sodium carbonate monohydrate to produce dense soda ash.

9 Claims, No Drawings

PROCESS FOR PRODUCTION OF DENSE SODA ASH FROM SODA ASH FINES

This application is a continuation of application Ser. No. 08/438,891, filed May 10, 1995 abandoned.

BACKGROUND OF THE INVENTION

This invention relates to a method of producing dense soda ash. In particular, this invention relates to a process to produce dense soda ash from sodium carbonate decahydrate crystals and soda ash fines.

Trona ore is a mineral that contains up to 95% sodium sesquicarbonate ($Na_2CO_3 \cdot NaHCO_3 \cdot 2H_2O$). Sodium sesquicarbonate is a complex salt that dissolves in water to yield approximately 5 parts by weight sodium carbonate ($Na_2CO_3$) and 4 parts sodium bicarbonate ($NaHCO_3$). Trona ore is processed to remove the insoluble material, the organic matter and other impurities in order to recover the valuable carbonates contained in the trona.

One such valuable carbonate, or alkali, produced from trona is soda ash (a commercial grade of sodium carbonate). Soda ash is one of the largest volume alkali commodities made in the United States. In 1992, trona-based soda ash from Wyoming comprised about 90% of the total U.S. soda ash production. Soda ash finds major use in the glass-making industry and for the production of baking soda, detergents and paper products.

In particular, one commercial grade of soda ash is known as dense soda ash because of its high bulk density. Dense soda ash is a free-flowing material. Regular dense commercial grade of soda ash has a loose bulk density in the range of about 60–65 lb/ft$^3$. Dense soda ash does not have uniform size particles, but rather about 80 weight percent of dense soda ash particles is between 30 and 100 U.S. mesh size.

A common method to produce dense soda ash from trona is known as the "monohydrate process", which requires large quantities of water (a scarce and valuable resource in Wyoming) and energy. In that process, crushed trona ore is calcined (i.e., heated) at a temperature between 125° C. and 250° C. to convert sodium bicarbonate into sodium carbonate, drive off water of crystallization and form crude soda ash. The crude soda ash is then dissolved in water and the resulting solution is filtered.

The filtered solution of sodium carbonate is fed to an evaporative crystallizer where some of the water is evaporated and some of the sodium carbonate forms into sodium carbonate monohydrate crystals ($Na_2CO_3 \cdot H_2O$). The monohydrate crystals are removed from the mother liquor and then dried to convert it to dense soda ash. The mother liquor is recycled back to the evaporator circuit for further processing into sodium carbonate monohydrate crystals.

Dense soda ash may also be made from sodium bicarbonate. The sodium bicarbonate is typically first processed into an intermediate product known as light soda ash. Light soda ash is prepared by calcining sodium bicarbonate. Light soda ash has a low bulk density, about 35 lb/ft$^3$, and is very porous, fine and dusty. Because of these unfavorable physical characteristics, dense soda ash is preferred over light soda ash by users and most of light soda ash is converted into dense soda ash.

Light soda ash is typically converted to dense soda ash by adding sufficient water or sodium carbonate solution to recrystallize the light soda ash as coarse sodium carbonate monohydrate. The recrystallized coarse sodium carbonate monohydrate particles are then calcined into dense soda ash.

Therefore, sodium carbonate monohydrate is an important intermediate product for the production of dense soda ash. Evaporative crystallization is the common way to produce monohydrate crystals but it uses considerable energy and large, expensive equipment. This step in the process uses even more energy if there is a large amount of soda ash fines that have to be dissolved and recycled repeatedly through the evaporative crystallizers.

The generation of soda ash dust or "fines" during the crystallization and other processes is a common problem in soda ash plants. Fines come from production of small soda ash crystals due to poor conditions of the crystallization such as recirculation pumps cavitation, presence of crystal habit modifiers such as acrylates, scaling of low temperature evaporator bodies or high levels of sodium bicarbonate in the sodium carbonate feed solution.

Fines are particles smaller than about 100 mesh, and most are usually removed from the commercial dense soda ash product. The collected fines material is either dissolved in the upstream processing equipment or reintroduced into the evaporative crystallization process, which in either case is a process inefficiency. It is not uncommon for more than 5% of the product to be recycled back into the process as fines.

Typically, substantial attrition of the sodium carbonate crystals is associated with their handling by the processing equipment. For example, vigorous agitation of the crystals during filtration or centrifuging can break the crystals apart. During the drying of the sodium carbonate monohydrate crystals into dense soda ash, the physical contact of the crystals with the equipment produces some fines that are recovered in a dust collector system. These fines are recycled back into the evaporative crystallizer.

Sodium carbonate decahydrate ($Na_2CO_3 \cdot 10H_2O$) is often formed as an intermediate product during process steps used for purification of sodium carbonate solutions. Sodium carbonate decahydrate crystals are relatively large and flat. Decahydrate crystals are very fragile when dehydrated in comparison with soda ash or sodium carbonate monohydrate.

Sodium carbonate decahydrate is unstable and dehydrates readily in dry air at moderate temperatures up to 32° C. to form sodium carbonate monohydrate. Unfortunately, the resulting sodium carbonate monohydrate is extremely porous, dusty and otherwise unsuitable for use as dense soda ash. At temperatures above 32° C., sodium carbonate decahydrate sinters or melts. Typically, sodium carbonate decahydrate crystals are re-introduced into the process, usually along with feed solution to the evaporative crystallizers to produce coarse sodium carbonate monohydrate crystals.

Therefore, there is a need for a process that directly produces a desirable product from the fines, rather than wastefully recycling the fines into the process. Also, there is a need for a simple, energy-efficient method for producing dense soda ash that eliminates the need for producing sodium carbonate monohydrate in expensive, energy intensive evaporative crystallizers.

SUMMARY OF THE INVENTION

This invention provides a simple method for producing dense soda ash by reacting soda ash fines or light soda ash with sodium carbonate decahydrate crystals to produce sodium carbonate monohydrate crystal agglomerates that have a quality sufficient to be calcined, or dried, into a dense soda ash product.

The sodium carbonate decahydrate is reacted together with the light soda ash or fines in a molar ratio preferably more than about 1 to 9 at an elevated temperature preferably between about 60° C. and about 150° C. This results in the reactants cementing or fusing into agglomerates containing sodium carbonate monohydrate crystals. A substantial portion of these agglomerates are larger than 100 mesh. These sodium carbonate monohydrate agglomerates are then calcined, or dried, to form a dense soda ash.

This invention advantageously bypasses the energy-intensive evaporative crystallization step yet produces coarse dense soda ash. Further advantages of this process will be apparent from the following detailed description.

DETAILED DESCRIPTION OF THE INVENTION

The present invention utilizes either light soda ash or dense soda ash fines, or a combination of both, to be reacted with sodium carbonate decahydrate to effect a rapid recrystallization of both reactants forming sodium carbonate monohydrate agglomerates with desirable physical properties so that it can be calcined, or dried, into dense soda ash.

The reaction is carried out by dry-blending the reactants at elevated temperatures. At higher temperatures, larger, coarser sodium carbonate monohydrate crystal particles are produced. This surprising result proceeds according to the following general reaction:

$$9Na_2CO_3 + Na_2CO_3 \cdot 10H_2O \rightarrow 10Na_2CO_3 \cdot H_2O$$

The product of the above reaction will desirably approximate the coarse particle size distribution of sodium carbonate monohydrate produced from traditional evaporative crystallization. Such commercial product has a size distribution larger than about 100 mesh comprising at least about 85 weight percent. However, this size distribution is not critical for this invention.

Beneficial results may be achieved even though a lower yield of coarse sodium carbonate monohydrate particles are produced. Any resulting fines may be separated and recycled back to react with more sodium carbonate decahydrate.

Desirably, the crude sodium carbonate monohydrate particles, not only have a similar size distribution, but also have a similar attrition rate as sodium carbonate monohydrate crystallized from traditional evaporative crystal growth processes. The crude sodium carbonate monohydrate particles produced by this invention may be cemented or fused agglomerates containing substantially newly formed sodium carbonate monohydrate crystals. The remainder of the agglomerate is anhydrous sodium carbonate. Generally, it is believed that the crude agglomerates will have a lower, more desirable attrition rate when the agglomerates contain higher amounts of sodium carbonate monohydrate crystals.

Also, it is desirable that the crude sodium carbonate monohydrate particles have a similar bulk density as traditionally produced sodium carbonate monohydrate. This way, the dense soda ash produced by this invention will have a correspondingly similar bulk density as regular commercial grade dense soda ash. However, the size distribution and attrition rate are more important characteristics of the final product than is the bulk density. That is, good quality dense soda ash may be produced with size distribution and attrition rate near commercial limits, even though the bulk density is slightly less than regular commercial grade. Therefore, for the purpose of describing the invention, the ultimate product is referred as "dense" soda ash, even though the bulk density may be below the range of regular commercial grade dense soda ash.

In practicing this invention, it is not necessary to adhere strictly to the stoichiometric ratios of the above reaction. The ratio of soda ash fines or light soda ash, i.e., anhydrous sodium carbonate fines, to sodium carbonate decahydrate can be varied above or below 9 to 1. In the case of using higher ratios, i.e., an excess of soda ash, not all the material will be converted to sodium carbonate monohydrate, but sufficient reaction will occur to effect a desirable result. In the case of using lower ratios, i.e., an excess of decahydrate, substantially most of reactant material will be converted.

It is also possible to use partially dehydrated sodium carbonate decahydrate in this reaction by adjusting the reactant ratio to provide at least a stoichiometric amount of water. Also, steam, water or other suitable aqueous solution, may be added as a fine mist or spray to the reactants to make up for the reduced hydrated content of the reactants.

In general, the invention appears to achieve better yields of dense soda ash when the reaction is carried out at higher temperatures. It is known that sodium carbonate monohydrate is formed at temperatures between 3° C. and 110° C. Monohydrate is an important intermediate product to produce dense soda ash. Therefore, it is believed the actual reaction temperature is in this range. However, it should be understood, that the reaction temperature, as reported herein, is crudely approximated by a measure of the reaction components at a time just after mixing all of them together.

On the other hand, the initial temperatures of the reactants may be more readily controlled and perhaps a better parameter to select for characterizing the invention. When measuring the temperature of the reactants before mixing together, it was found that the invention produces substantially coarse monohydrate particles when the initial temperature of the light soda ash or soda ash fines is preferably between about 60° C. and 150° C. and the sodium carbonate decahydrate is between about 10° C. and room temperature.

In situations when the initial temperature of the soda ash is above 110° C., it is believed that the heat of evaporation absorbed by the water in the sodium carbonate decahydrate cools the reactants to a reaction temperature below 110° C. so that sodium carbonate monohydrate crystals can form. When the initial temperature of the soda ash was much higher, for example, at 210° C., it was found that steam was violently produced upon the addition of decahydrate to the hot soda ash. The free moisture and water of crystallization in the decahydrate crystals immediately flashed. This vigorous eruption of steam, in this case, prevented the formation of coarse monohydrate particles.

After coarse sodium carbonate monohydrate particles are formed, the particles are dried at temperatures above 110° C. It is believed that the particles may be dried at temperatures between 125° C. and 250° C. to convert the monohydrate to dense soda ash in accordance with standard industry practices, as is well known to those skilled in the art.

This invention is advantageous because it bypasses the usual evaporative crystallization step associated with most commercial dense soda ash production facilities. The process efficiencies associated with this invention reside in the fact that the soda ash fines, or light soda ash, need not be recycled back into the process. For example, the soda ash fines need not be leached, heated, cooled and/or pumped, as in the prior art processes. Also, the sodium carbonate decahydrate bypasses the evaporative crystallization step and is converted directly to coarse sodium carbonate monohydrate. In addition, equipment requirements are minimal consisting only of appropriate feed devices which can proportionately feed ingredients into a dry mixer.

Generally, in practicing this invention, it is preferable to have an amount of sodium carbonate decahydrate in the reaction that is in excess of the stoichiometric ratio. In part, it is believed that better results were seen with excess sodium carbonate decahydrate because the invention, as noted in the following examples, was carried out in an open vessel. Some of the moisture may have been evaporated. In carrying out the invention in a closed vessel, it is expected that good results may be obtained with lesser amounts of sodium carbonate decahydrate.

In one example, soda ash fines at 70° C. were reacted with sodium carbonate decahydrate at 10° C. at a mole ratio of 4.5 to 1 (equivalent to 100% stoichiometric excess decahydrate) in an open vessel. The reaction produced sodium carbonate monohydrate particles with a size distribution above 80 mesh comprising about 90 weight percent. Such sodium carbonate monohydrate product prepared at these conditions show substantial structural integrity, that is, sufficiently strong crystals such that in an attrition test about 9 weight percent fines were produced from the coarse particles.

Under a different set of operating conditions, soda ash fines at 155° C. were reacted with sodium carbonate decahydrate at 10° C. at a mole ratio of 7.5 to 1 (equivalent to 20% stoichiometric excess decahydrate) in an open vessel. The reaction produced sodium carbonate monohydrate particles with a size distribution above 80 mesh comprising about 82 weight percent of the product. Such sodium carbonate monohydrate product produced at these conditions showed substantial structural integrity, that is, sufficiently strong crystals such that in an attrition test about 15 weight percent fines were produced from the coarse particles.

In comparison with sodium carbonate monohydrate produced by evaporative crystallization in a dense soda ash plant, the plant monohydrate crystals had a particle size distribution above 80 mesh comprising about 94 weight percent of the product. Such plant monohydrate has substantial structural integrity, that is, sufficiently strong crystals such that in an attrition test about 6 weight percent fines were produced from the coarse particles.

It is believed, in the reaction according to this invention, that the moisture from the sodium carbonate decahydrate crystals cooperates with the heat to cement or fuse the sodium carbonate decahydrate crystals and the soda ash particles together. Mixing the reactants together forms coarse agglomerates. The moisture from the decahydrate crystals redistributes through the agglomerate and reacts with the soda ash particles to convert to sodium carbonate monohydrate. Thus, it is believed that new monohydrate crystals grow on the agglomerate substrate. It is believed that this explains the increased new growth of crystals and the more crystalline structure of the agglomerates when higher ratios of sodium carbonate decahydrate are used in the reaction.

This invention may be practiced in several different ways. However, common to most methods, the sodium carbonate decahydrate crystals should be kept cool, that is below about 32° C., preferably about 10° C.

In one method, the cool sodium carbonate decahydrate is blended with light soda ash, or soda ash fines, or a combination thereof, that have been preheated to a desired temperature. The reactants would then be mixed together while the reaction temperature is maintained.

Likewise, in another method, cool sodium carbonate decahydrate crystals are blended with the light soda ash, or soda ash fines, or a combination thereof, that have been heated up to an intermediate temperature. After the reactants are blended together then the heat of the mixture could be raised up to the desired reaction temperature.

In another method, cool sodium decahydrate crystals could be mixed with cool light soda ash, or soda ash fines, or a combination thereof. This mixture would then be heated up to the desired reaction temperature.

In yet another method, cool sodium carbonate decahydrate crystals could be mixed with a small portion of cool light soda ash, or soda ash fines, or a combination thereof. These reactants would be blended together and then added to the remaining portion of light soda ash, or soda ash fines, or combination thereof, that have been preheated to either an intermediate or other desired temperature. The resulting mixture would then be either heated up to the reaction temperature or the reaction temperature would be maintained.

From the foregoing, it should be understood that these methods described here are illustrative. One skilled in the art may readily adapt or modify these methods, or develop other methods from the teachings here, that would be within the scope of the contemplated invention.

It is, of course, desirable that the sodium carbonate decahydrate crystals remain cool prior to their mixture with the other reactants. Sodium carbonate decahydrate is somewhat unstable and dehydrates readily in air at moderate temperatures. Keeping it cool minimizes the amount of dehydration. Likewise, keeping it cool, that is below 32° C., prevents the sodium carbonate decahydrate from melting. This enables it to be more easily handled and blended with the other reactants.

It is generally contemplated that the reactants be dry-blended during the reaction. Gentle mixing is preferred because of the need to allow the sodium carbonate monohydrate crystals and the agglomerates to grow to a sufficiently coarse size. The newly formed agglomerates as well as the sodium carbonate decahydrate crystals are relatively weak and subject to break apart if the handling is too vigorous. However, under operating conditions where higher temperatures are used and greater amounts of excess sodium carbonate decahydrate are used, then the reactants can tolerate more vigorous mixing and still achieve substantially coarse sodium carbonate monohydrate agglomerates having a desirable particle size distribution.

One skilled in the art may readily scale up this invention for practice on a commercial scale. For example, such equipment as rotary tumblers or twin rotor mixers that are less aggressive and generally do not break down agglomerates may be suitable for use with this invention. The equipment should preferably be steam-jacketed and have internal steam coils to provide the needed heat for the reaction. The reactants should be mixed for a period of time ranging from several minutes up to an hour or more depending on the temperature and feed ratio of the reactants. Generally, it is expected that with increasing temperature and increasing amounts of sodium carbonate decahydrate then a shorter mixing time and reaction time is required.

The sodium carbonate monohydrate thereby produced may be processed into dense soda ash by drying it at a temperature between about 125° C. and 250° C. Such dense soda ash produced according to this invention is expected to have properties substantially similar to dense soda ash produced by current known commercial methods. Any fines produced during the drying step that have been collected in the dryer dust collector system may be processed and converted back into sodium carbonate monohydrate according to the invention described above.

The foregoing may be better understood from the following examples, which are presented for purposes of illustration and are not intended to limit the scope of the invention.

EXAMPLE NO. 1

200 grams of soda ash fines were measured into a 600 ml beaker. The beaker was clamped over a low flame. The soda ash fines were heated to a temperature of about 55° C. 60 grams of sodium carbonate decahydrate crystals were measured out. The decahydrate crystals were at a temperature of slightly below 10° C. Small amounts of the decahydrate crystals were poured into the beaker while stirring with a double beater hand mixer over the course of about 3–5 minutes. The temperature of the mixture decreased to about 45° C. The mixing continued with a single beater for approximately 30–40 minutes. During this time the temperature was held at the mid to low 40° C. range. The mixture was then transferred to a rolling jar which was rolled at room temperature with the jar open to the atmosphere. Visual inspection of this material showed numerous sodium carbonate monohydrate particles of about 0.1 mm in diameter. These particles were either blocky (not rolled) agglomerates or crystals formed from the new growth.

EXAMPLE NO. 2

200 grams of soda ash fines were measured into a 600 ml beaker. The soda ash fines were heated to a temperature of about 98° C. 72 grams of sodium carbonate decahydrate crystals were measured and slowly added to the heated soda ash fines over the course of 5 minutes. The temperature of the mixture decreased to about 75° C. This mixture was continually mixed in the open beaker for another 6 minutes. The beaker then remained open for a period of about 12 hours as it naturally cooled off. The visual appearance of this product was very similar to that from Example No. 1.

EXAMPLE NO. 3

200 grams of soda ash fines were measured into a 600 ml beaker and then heated up to a temperature of about 155° C. 72 grams of cold sodium carbonate decahydrate crystals were slowly added into the heated soda ash fines over a period of 3 minutes. The temperature of the mixture decreased to about 100° C. A single beater was used to mix the fines and the decahydrate crystals for several more minutes. Visual inspection of the product was not remarkably different from the previous two examples. However, larger agglomerate particles of up to 8 millimeters were noted. Also, there were other significant irregular-shaped agglomerates found.

EXAMPLE NO. 4

200 grams of soda ash fines were measured and placed in a 600 ml beaker. 23.5 grams of the soda ash fines were removed and mixed with 72 grams of sodium carbonate decahydrate crystals. This pre-mix was kept at room temperature and occasionally shaken until it was used. The remainder of the soda ash fines in the beaker was heated up to about 155° C. The decahydrate soda ash fine pre-mix was then added to the heated soda ash fines. The mixture was then put into a rolling jar and tumbled for a period of time until cooled to room temperature.

EXAMPLE NOS. 5–14

Different amounts of sodium carbonate decahydrate crystals were pre-mixed with a small amount of soda ash fines at room temperature. The amounts of decahydrate crystals varied between 20% excess and 100% excess by weight of the amount corresponding to the stoichiometric ratio required. The remainder of the soda ash fines were measured into an open beaker and heated to the desired temperature ranging from about 60° C. to 140° C. The pre-mix decahydrate crystals and soda ash fines were then measured into the heated soda ash fines. The temperature of the mixture decreased to below about 55° C. to 100° C., respectively, corresponding to the initial heated soda ash fines temperature of 60° C. to 140° C. Heating and mixing of this mixture continued according to one of two methods until the product was dried. The mixing was either continuous and vigorous (CV) using a single-beater mixer, or occasional and gentle (OG) using hand stirring with a spatula or a stirring rod. The resultant product was then cooled and examined.

In preparing the reactants, for the 20% excess decahydrate batches, the pre-mix consisted of 72 grams of decahydrate crystals and 20 grams of soda ash fines. The remaining 180 grams soda ash fines were heated up. For the 50% excess decahydrate batches, 25 grams of soda ash fines were pre-mixed with 90 grams of decahydrate crystals. The remaining 175 grams of soda ash fines were heated. For the 100% excess decahydrate batches, the pre-mix was made by mixing 120 grams of decahydrate crystals with 33 grams of soda ash fines. The remaining 167 grams of soda ash fines were heated up. After the pre-mixture was added to the heated soda ash fines, the mixing continued for a period of approximately 1 hour in an open vessel.

Visual inspection of the ensuing product showed that a substantial amount of sodium carbonate monohydrate agglomerates were achieved. Approximately 50 grams of each product were taken out and mechanically screened for approximately 3 minutes to determine the particle distribution as noted in Table 1. In general, all but the finest particles were agglomerates. The largest fractions were mostly pelletized or rolled, while the smaller fractions +80 and +170 were crystalline agglomerates. The +42 mesh size fractions were generally mixtures of pellets and crystalline agglomerates. The crystallinity of the product seemed to increase, or was more pronounced with increasing temperature and increasing amount of sodium carbonate decahydrate used.

In addition, attrition tests were conducted to determine the structural strength of the product. The attrition test was conducted as follows. A portion of the product was classified with an 80 mesh screen. The larger fraction or +80 mesh fraction was placed into a pan and set in an oven at 115° C. for approximately 12 hours. 80 grams of this fraction were then placed with 300—¼ inch steel balls onto an 80 mesh screen that was mechanically shaken for about 6 minutes at 240 cycles per minute. The resulting fines were then measured as a weight percent of the 80 gram fraction.

The results of the above tests are summarized in Table 1 and compared with the results of similar tests for sodium carbonate monohydrate crystals produced from evaporative crystallization in a commercial plant and anhydrous sodium carbonate produced from the plant, as well as, for the soda ash fines used in the above examples.

From these examples, it is evident that coarse sodium carbonate monohydrate can be produced directly by reacting light soda ash or soda ash fines with sodium carbonate decahydrate crystals. The resulting sodium carbonate monohydrate product contains large, coarse agglomerate particles that have a particle distribution and strength that compares favorably with the sodium carbonate monohydrate crystals that are produced from an evaporative crystallization process.

Accordingly, great process efficiencies can be achieved by incorporating this invention into an existing dense soda ash plant. The evaporative crystallizers then may be supplemented with simple dry blending mixers. One skilled in the art may readily select appropriate equipment that may be used for practicing the invention in a soda ash plant. For example, a low speed twin screw rotor may be adapted to transfer heat through a jacketed body and hollow screws in order to maintain the proper temperatures for reacting the light soda ash and decahydrate crystals. Other equipment may be appropriately selected keeping in mind the need for gentle mixing of the reactants to minimize attrition, agglomerate breakdown and maintain good particle size.

To minimize the waste of constantly recycling the soda ash fines and crude soda ash fines into an upstream dissolving tank, it may be useful to convert the fines directly to a usable form of sodium carbonate monohydrate by practicing this invention. In sum, a great reduction in the consumption of energy is achieved by reducing the feed to the evaporative crystallizers and using heated dry mixers.

As is apparent from the stoichiometry of this process, only very little sodium carbonate decahydrate is needed to react with a relatively larger amount of light soda ash fines. This small amount of decahydrate crystals may be obtained from numerous sources and imported into this process for efficiently converting the soda ash fines into a desired product. The sodium carbonate monohydrate thereby produced may be calcined, or dried, in the normal fashion to produce dense soda ash.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

temperature between about 125° C. and 250° C. said sodium carbonate monohydrate to form dense soda ash having an average bulk density of at least about 55 lb/ft³.

2. The process according to claim 1, wherein the molar ratio of light soda ash or soda ash fines or combination thereof to sodium carbonate decahydrate is between about 4.5:1 and about 7.5:1.

3. The process according to claim 1, wherein the light soda ash or soda ash fines or combination thereof is pre-heated to a temperature between about 600° C. and about 150° C.

4. The process according to claim 1, further comprising the step of heating the mixture to achieve the reaction temperature.

5. The process according to claim 1, further comprising blending the sodium carbonate decahydrate with a first portion of light soda ash or soda ash fines or a combination thereof at a temperature below about 32° C. before blending the sodium carbonate decahydrate with the pre-heated light soda ash or soda ash fines or a combination thereof.

6. The process according to claim 1, wherein said sodium carbonate decahydrate is partially dehydrated.

7. The process according to claim 1, wherein the sodium carbonate monohydrate has a particle size distribution larger than 100 mesh above about 40 weight percent.

8. The process according to claim 1, wherein the reaction is carried out at a temperature less than about 110° C.

9. A process for the production of dense soda ash, the process comprising mechanically blending anhydrous

TABLE 1

| | Soda Ash | | | | Weight Percent Particle Distribution - Mesh Size | | | | | | | |
|---|---|---|---|---|---|---|---|---|---|---|---|---|
| Example No. | Temp (°C.) | Reaction Temp (°C.) | % XS Deca | Mixing Method | +24 (0.7 mm) | +42 (0.35 mm) | +80 (0.175 mm) | +170 (0.088mm) | -170 | % +80 | Attrition % Fines | Bulk Dens. (lb/ft³) |
| 1 | 55 | 45 | 0 | CV | 11 | 6 | 12 | 31 | 39 | 29 | | |
| 2 | 98 | 75 | 20 | | 20 | 6 | 18 | 42 | 14 | 44 | | |
| 3 | 155 | 100 | 20 | | 32 | 14 | 35 | 17 | 1 | 82 | 15.5 | |
| 4 | 155 | — | 20 | | 24 | 22 | 30 | 21 | 3 | 76 | | |
| 5 | 70 | 55 | 50 | OG | 13 | 9.7 | 21.3 | 39.2 | 16.8 | 44 | | |
| 6 | 70 | — | 100 | OG | 35.8 | 27.1 | 27.5 | 8.6 | 0.9 | 90.4 | 9.1 | 51.4 |
| 7 | 95 | 90 | 50 | OG | 15.2 | 15.0 | 47.0 | 21.5 | 1.2 | 77.2 | | |
| 8 | 95 | 70 | 100 | OG | 29.3 | 25.4 | 34.5 | 10.2 | 0.6 | 89.2 | 8.9 | 56.3 |
| 9 | 130 | 100 | 20 | CV | 24.5 | 22.6 | 34.0 | 16.7 | 2.2 | 81.1 | 22.6 | 55.3 |
| 10 | 140 | — | 20 | OG | 16.5 | 19.0 | 41.3 | 19.9 | 3.2 | 76.8 | 20.3 | 54.6 |
| 11 | 130 | 100 | 50 | CV | 18.5 | 25.2 | 41.5 | 13.7 | 1.1 | 85.2 | 15.8 | 57.1 |
| 12 | 130 | — | 50 | OG | 38.6 | 25.3 | 31.2 | 4.6 | 0.3 | 95.1 | 8.0 | 55.5 |
| 13 | 120 est. | — | 100 | CV | 16.5 | 20.2 | 31.0 | 27.0 | 5.4 | 67.7 | 29.6 | 57.5 |
| 14 | 120 est. | — | 100 | OG | 36.0 | 25.7 | 30.0 | 7.6 | 0.7 | 91.7 | 7.4 | 52.5 |
| Plant Mono. | | | | | 2.6 | 50.0 | 41.9 | 4.9 | 0.6 | 94.5 | 6.2 | |
| Plant Anhyd. | | | | | 0.8 | 25.7 | 61.8 | 10.7 | 1.0 | 88.3 | 11.0 | |
| Soda Ash Fines | | | | | — | 0.2 | 18.6 | 36.2 | 45.1 | 18.8 | | |

What is claimed is:

1. A process for the production of dense soda ash comprising preheating light soda ash, soda ash fines or a combination thereof to a temperature between about 35° C. and about 200° C., mechanically blending the preheated light soda ash or soda ash fines or combination thereof with sodium carbonate decahydrate, wherein the molar ratio of light soda ash or soda ash fines or combination thereof to sodium carbonate decahydrate is less than about 9:1, reacting at a temperature between about 60° C. and about 150° C. said components to form substantially coarse agglomerates of sodium carbonate monohydrate, and then calcining at a sodium carbonate fines pre-heated above 35° C. and sodium carbonate decahydrate crystals, wherein the molar ratio of fines to decahydrate crystals is less than about 9:1, reacting at a temperature between about 60° C. and about 150° C. said fines and crystals to form substantially coarse, fused agglomerates containing sodium carbonate monohydrate and then calcining the fused agglomerates at a temperature between about 125° C. and about 250° C. to produce dense soda ash having an average bulk density of at least about 55 lb/ft³.

* * * * *